March 11, 1941.  W. E. GREENAWALT  2,234,473
METALLURGICAL APPARATUS
Filed June 4, 1938  3 Sheets-Sheet 1

INVENTOR.
William E. Greenawalt

March 11, 1941.                W. E. GREENAWALT                2,234,473
                              METALLURGICAL APPARATUS
                               Filed June 4, 1938              3 Sheets-Sheet 2

INVENTOR.
William E. Greenawalt

Patented Mar. 11, 1941

2,234,473

UNITED STATES PATENT OFFICE 2,234,473

METALLURGICAL APPARATUS

William E. Greenawalt, Denver, Colo.

Application June 4, 1938, Serial No. 211,834

9 Claims. (Cl. 266—10)

My invention relates to metallurgical apparatus and processes, and particularly to the treatment of finely divided ore, such as flotation concentrates. The object of the invention is to simplify the treatment of such ores, to save fuel, to minimize the dust nuisance which is an unavoidable accompaniment of the heat treatment of finely divided ore, and, where applicable, to recover elemental sulphur from sulphide ores.

The invention may be applied either to oxidation or reduction. It will be described more particularly in relation to oxidizing roasting and smelting of copper ores, and to reducing roasting for the production of elemental sulphur and subsequent smelting, or other treatment, of the reducingly roasted sulphide ore.

Figure 1:
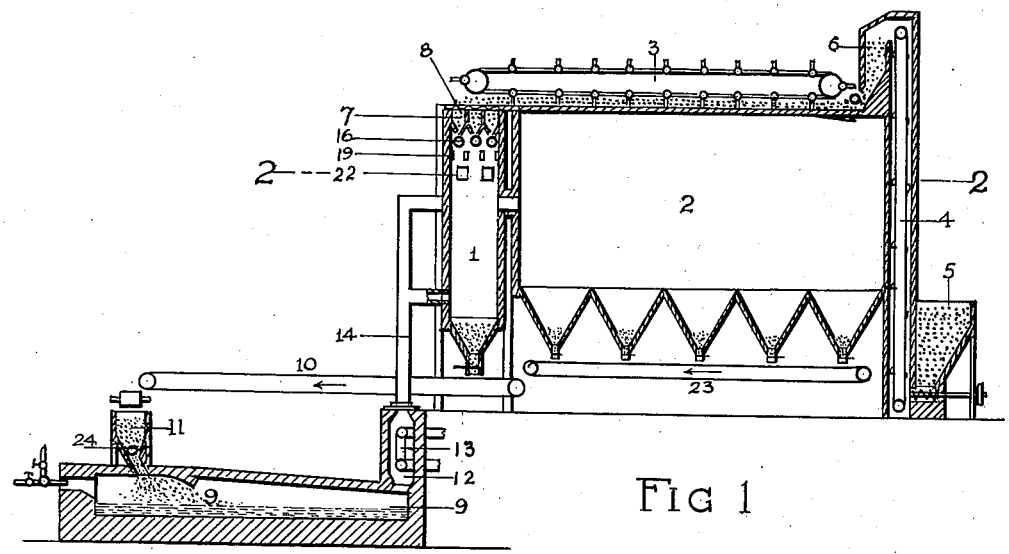
Figure 2:
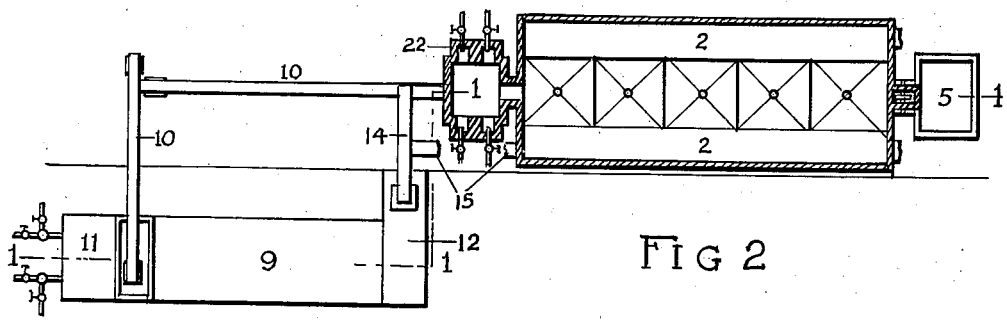
Figure 3:
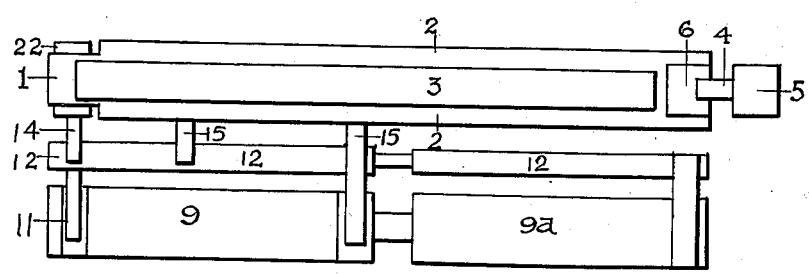
Figure 4:
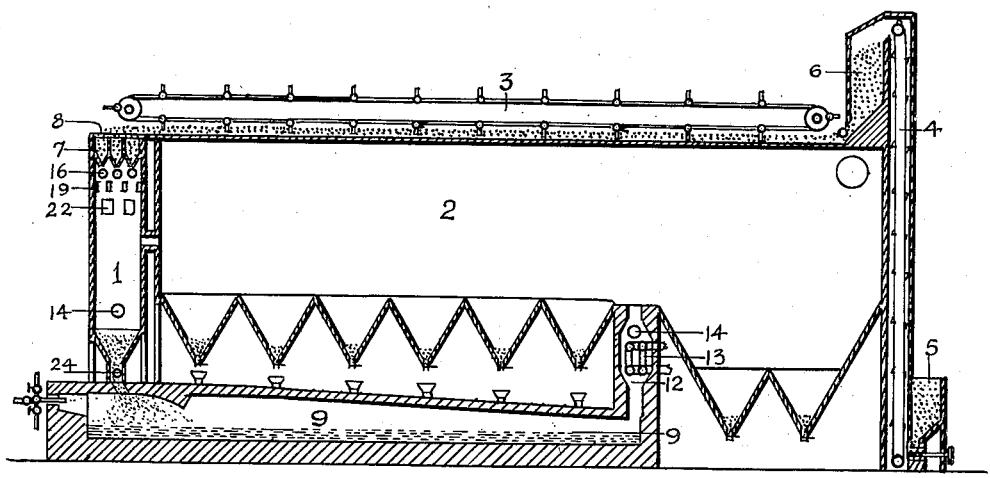
Figure 5:
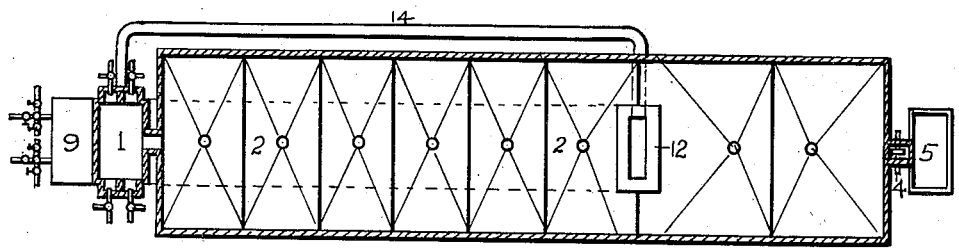
Figure 7:
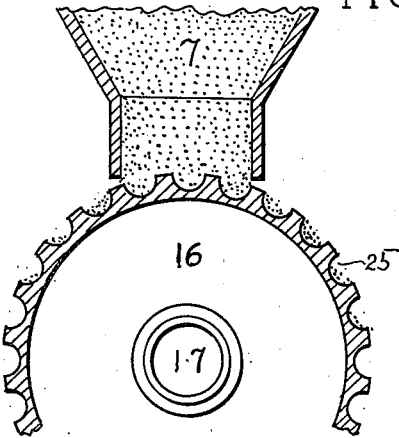
Figure 6:
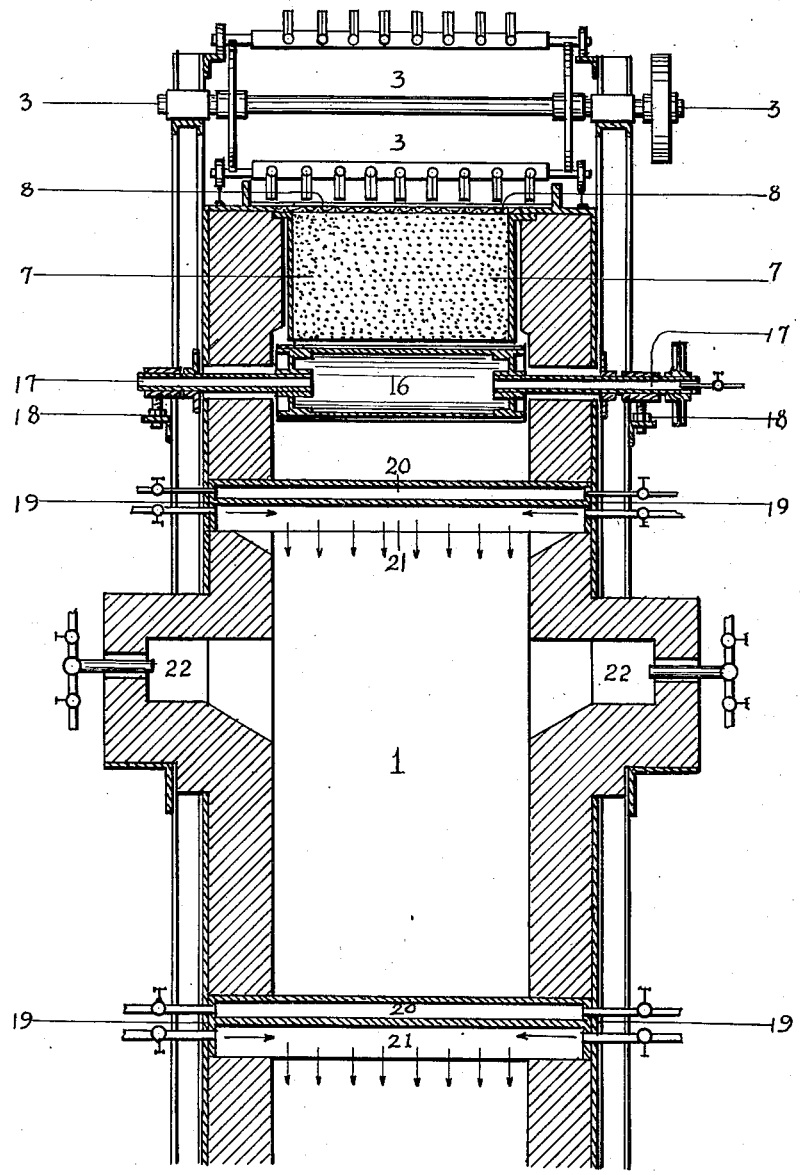

In describing the invention reference may be made to the accompanying drawings in which Fig. 1 is a vertical longitudinal section of the apparatus on the line 1—1 of Fig. 2, arranged so as to show the flow of the process. Fig. 2 is a horizontal section on the line 2—2 of Fig. 1. Fig. 3 is a modification, in diagrammatic plan. Fig. 4 is a longitudinal section of another modification particularly adapted to small scale operations. Fig. 5 is the corresponding horizontal section. Fig. 6 is a detail cross section of the upper part of the roasting furnace. Fig. 7 is a detail of the ore distributing mechanism in the upper part of the shaft.

Referring to the drawings: 1 is a shaft roasting furnace, 2 is a dust chamber adjacent the shaft communicating with the roaster shaft through the gas inlet passage 34, and having an exhaust outlet 35, communicating with a stack or chimney (not shown) to create a flow of gas through the apparatus, 3 is an ore drier over the dust chamber, 4 is an elevator to elevate the fine ore from the bin 5 to the bin 6, from which the ore is fed, or delivered, to the drier 3, and is advanced by means of the drier rabbles, while drying, toward the shaft 1. The floor of the drier is heated by the hot gas from the shaft flowing through the dust chamber. The dried ore is delivered from the drier, by gravity, into the receiving hoppers 7, which are covered with a screen 8 so that lumps in the dried ore, that would be likely to give trouble in the ore distributing mechanism in the shaft, are automatically eliminated by the screen. 9 is a smelting furnace for smelting the hot roasted ore from the shaft. 10 is a conveyor to deliver the hot ore from the shaft into the hopper 11, from which it is distributed by means of the regulator and distributor 24, preferably in a thin stream or shower into the smelting furnace. 12 is a heat exchanger, either for the purpose of heating water, or for heating air by means of the pipes 13, when it is desired to reduce the temperature of the smelting furnace waste gas before introducing it into the shaft through the gas flue 14. Any or all of the hot waste gas from the smelting furnace may be bypassed into the dust chamber through the bypass flues 15, if it is not desired to pass the smelter gas through the roaster shaft. The settled dust in the dust chamber 2 may be delivered by means of the conveyor 23 to the conveyor 10, and thus the dust may be automatically delivered, with the hot ore from the shaft, to the smelting furnace.

The arrangement shown in Fig. 3 permits the hot gas from the smelting furnace to be conveniently introduced directly into the dust chamber, or indirectly into the dust chamber by first passing it through the shaft, should the ore be of such a nature as to require heating rather than sulphur elimination. The arrangement also permits of a convenient arrangement for the heat interchanger 12, and it makes possible the direct delivery of the hot ore from the shaft into the smelting furnace, regardless of whether the hot gas from the smelting furnace is introduced directly into the dust chamber or first into the shaft and then into the dust chamber.

The arrangement shown in Figs. 4 and 5 is well adapted for small plants, and shows the roaster shaft and dust chamber directly over the smelting furnace. It eliminates the hot ore conveyor, and the roaster dust may be drawn directly from the dust chamber into the smelting furnace. The amount of dust which cannot be so returned will be comparatively small and can be handled in some other way.

The ore distributing device, shown in detail in Figs. 6 and 7, consists essentially of the hopper 7 with a suitable opening in the bottom which may be in the form of one or several sections of a slot several inches wide, and a rotatable hollow cylinder 16 below the hopper and in close proximity to the slot ore outlet. The hollow cylinder is supported by a hollow shaft 17 mounted on adjustable bearings 18, so arranged that the shaft and cylinder may be raised or lowered in relation to the hopper outlet, to control the volume of ore flowing from the hopper upon the cylinder. The cylinder may be rotated continuously in one direction, but it is preferred to rotate it reciprocally so that the ore will alternately be fed from both sides of the cylinder, thus giving a more even distribution of the ore through the shaft. The hollow shaft supporting the cylinder permits the circulation of air through the cylinder to keep it within the safe working limits of the cylinder, which will usually be made of high heat resistant alloy metal. Just below the cylinders are stationary horizontal hollow beams 19 divided into two sections 20 and 21 for the introduction of air or other gas into the furnace and so arranged that the ore dropping from the cylinders will be further scattered throughout the furnace shaft. Fire boxes 22 are located just below the hollow beams 19 to heat the upper part of the furnace shaft, especially on starting the furnace, and to act, under any conditions, as a regulator of the heat in the upper part of the shaft to insure quick or practically instantaneous ignition of fine sulphide ore as it is fed into the furnace. The temperature of the upper part of the shaft will usually be from 800 to 1000 deg. C. (1472 to 1832 deg. F.). After the furnace is in operation, in treating heavy sulphide ore, the heat will ordinarily be sustained by the burning of the sulphur in the ore. At a furnace temperature of from 800 to 1000 deg. C., the distributing cylinder should be slightly cooled, usually just enough to prevent damage through overheating. The dried ore, which is relatively cool as compared with the inside of the furnace, will have a tendency to slightly cool the cylinder, and any additional cooling can be effected by circulating cooling air or any other fluid through the hollow cylinder by means of the hollow shaft. Air, preferably preheated by means of pipes in the roaster or smelter dust chambers, may be introduced into the roaster shaft through the hollow beams 19. A combustible gas may be introduced with or without the air, if desired. The hollow beams 19 may be kept cool enough to prevent injury from excessive heating by casting them of heat resistant alloy metal and by circulating air or other fluid through the upper compartment 20 of the beam, while air or any other fluid may be introduced into the shaft through the lower compartment 21, as described more fully in my co-pending application Serial No. 154,816, filed July 21, 1937.

The surface of the ore distributing cylinder 16 is preferably designed with corrugations 25 as shown in detail in Fig. 8. This arrangement permits of a reasonably close fit of the cylinder with the hopper 7 to prevent appreciable amounts of gas to flow into or out of the furnace shaft, even when the hopper is empty. The corrugations also serve to pass through small lumps, which might not otherwise pass between a smooth cylinder surface and the bottom of the hopper, on a close fit between the two. The reciprocal rotation of the cylindrical distributor will also tend to prevent difficulties which might arise, due to lumps, in a continuous one way rotation. Reciprocal rotation will tend to place the lumps in the corrugations, after which they may be discharged without causing trouble. It is preferred, when practical, to shower the hot ore from the roaster shaft into the smelting furnace in preference to introducing it intermittently in a mass. It is practical to create a highly heated zone close to the oil burners, considerably above the regular temperature of the smelting furnace, and the ore, introduced in a thin stream or showered through this highly heated zone, can be heated much more quickly and more economically to the smelting temperature than an equal amount of ore can be brought to the smelting temperature by heating a mass from the top down, which is the usual procedure in reverberatory smelting.

*Oxidizing roasting and smelting.*—The process will now be described as applied to the treatment of copper concentrates. There are two common types of copper concentrates produced in milling copper ores. One type contains only about the amount of sulphur necessary for the formation of matte for converting; this concentrate may be smelted without roasting and is frequently smelted without drying. Another type, high in sulphur, makes roasting imperative to get the grade of matte desired for converting; this type is most common. In reverberatory smelting of wet concentrate or cold ore most of the fuel represents unused heat, largely because the heat required to bring the wet and cold concentrate to the smelting temperature, in addition to the large excess of air used in burning the excess fuel which has to be heated to the smelting temperature, escapes at practically the temperature of the smelter charge, or from 2000 to 2300 deg. F. In blast furnace smelting the excess heat from the smelting zone is largely used to bring the cold charge to the smelting temperature, and the temperature of the escaping gas is relatively low. This, in reverberatory smelting, is impractical, because the entire charge has to be kept in a fluid state, and the rear of the furnace, where the gas escapes, is almost as hot as other parts of the furnace. Only about twenty per cent of the heat of the fuel used in reverberatory smelting can be accounted for in the slag and the matte. In ordinary reverberatory smelting on a large scale some of the eighty per cent of the waste heat of smelting is recovered as steam for generating power, but the recovery is low and inefficient. One of the objects of the present invention is to recover a large proportion of the heat ordinarily wasted in reverberatory smelting by using it to preheat the smelter charge, to furnish hot air to burn the fuel used in smelting, and to eliminate the necessity of introducing a large amount of excess air or gas, the heating of which consumes expensive fuel.

Referring now more particularly to Figs. 1, 2, and 3, and assuming a concentrate low in sulphur, and which, as produced in the mill, contains from ten to twelve per cent water: It is preferred to place the furnace shaft close to the exhaust end of the smelter, partly to get the best advantage of the heat in the smelter gas, but also to avoid dust complications incident to conveying dust-laden gas over long distances. The waste smelter gas is usually at a temperature of from 2000 to 2300 deg. F., and this is rather high to be introduced direct into the roaster shaft. The smelter gas usually contains only from 0.1 to 0.5 per cent oxygen. It is desirable to slightly reduce the temperature of this waste smelter gas before introducing it into the roaster shaft. This may be done by heating the air or water in pipes 13 located in the heat exchanger 12.

The concentrate as it comes from the mill is elevated from the receiving bin 5 to the drier bin 6 and then passed over the drier 3 located over the dust chamber 2, and the dried ore is delivered to the receiving hoppers 7, from which it is distributed through the roaster shaft 1 by the cylinders 16 and showered through the shaft. The hot waste smelter gas, at as high a temperature as practical, is introduced into the lower part of the shaft and flows upwardly against the descending shower of ore. The ore is thus preheated and roasted to the desired temperature for smelting, say to about 1500 to 1800 deg. F., while the hot gas has been correspondingly cooled. The amount of the cooling of the gas will depend on the temperature of the dried ore introduced into the shaft. The temperature of the ore in the upper part of the shaft can be regulated by the fireboxes 22, to give the desired temperature to the roasted ore. The gas from the smelting furnace and roaster shaft passes into the dust chamber, and the residual heat is used to dry the ore, and, if desired, to heat air for use in other steps in the process. The dust chamber and dryer may be made as long as necessary to properly dry the ore and use the heat in the waste gas. The hot ore from the shaft is transferred to the smelting furnace, and the hot air from the heat interchanger may be used to burn the fuel in smelting the hot charge. The amount of sulphur desired in the roasted ore can be regulated by the introduction of air into the hot gas from the smelting furnace, which may be introduced at the heat exchanger. If it is desired to retain as much sulphur as practical in the hot roasted ore for matte purposes in smelting, no air is added to the smelter waste gas. In other cases only enough air is added to give the sulphur elimination desired, and a proportionate amount of hot smelter gas may be by-passed direct to the dust chamber through the flues 15, as shown more particularly in Fig. 3. The dust from the dust chamber may be returned to the smelting furnace, as shown, by the conveyors 23 and 10.

If the copper ore is largely in the form of pyrite and chalcopyrite then it is desirable to eliminate a large amount of the sulphur in roasting, and this oxidation of the sulphur will bring the ore to the temperature desired without the addition of extraneous heat. In this case it is best to use the general arrangement shown in Figs. 4 and 5, especially for small plants. The hot ore from the roaster shaft is introduced direct into the smelting furnace and conveying of the hot roasted ore may be dispensed with, or simplified, as shown in Fig. 4.

*Reducing roasting and smelting.*—The process so far described refers to sulphur elimination through heating or oxidizing roasting. With ore high in sulphur it may be profitable to roast reducingly to recover the sulphur in elemental form. The recovery of sulphur from sulphide ores has for many years presented interesting possibilities, especially in connection with smelting. Most of the sulphur in copper ores is in the form of pyrite, either as iron sulphide or as iron-copper sulphide. In oxidizing roasting, which is now universally used in preparing ores for smelting, the sulphur is oxidized to sulphur dioxide, and this in most cases is the best method of procedure in small plants or on ores relatively low in sulphur. But in most large copper reduction plants the sulphur content of the ore is rather high, usually between 30 and 40 per cent, and the ore, which is usually a flotation concentrate, is ordinarily finer than 50 to 100 mesh. In such or similar cases it is preferred to proceed as follows: The flotation concentrate is, preferably, treated, either after or during flotation, to separate the slime from the sand, as set forth in detail in my co-pending applications, Serial No. 37,928, filed August 26, 1935, and Serial No. 99,120 filed September 3, 1936. The slime represents the extreme fines, or colloids, usually of lower specific gravity than the sand, and represents the greater part of the dust ordinarily produced in roasting and smelting when the concentrate is treated as a whole. The sand, separated by water classification from the slime, will also contain the highest percentage of sulphur. The sand, representing, say, from ninety to ninety-five per cent of the concentrate, is dried, as described, preparatory to showering it through the shaft roasting furnace. The drying can be adjusted so as to bring the temperature of the ore close to the incipient point of the distillation of sulphur, which in most sulphide ores is quite low, or from 150 to 300 deg. C. (302 to 572 deg. F.). The dried ore is showered through the shaft and through the hot waste gas from the reverberatory smelting furnace, introduced into the shaft at a temperature of from 800 to 1000 deg. C. (1472 to 1832 deg. F.), or at as high a temperature as practical, with or without the addition of a reducing agent, such as fine coal or a hydrocarbon. The temperature of the shaft should be maintained at 800 to 1000 deg. C., which, if necessary, can be done with the help of the fireboxes 22, at the upper part of the shaft, and which may be fired reducingly.

Most of the sulphur in pyrite may be driven off in elemental form at a fairly low temperature, or about 700 to 800 deg. C. The fixed atom of sulphur presents a more difficult problem. In the presence of steam and a reducing agent, or at least in a non-oxidizing atmosphere, and at a temperature of from 800 to 1000 deg. C., the fixed atom of sulphur can also be satisfactorily eliminated to the extent required for copper smelting, and recovered in elemental form. The temperature of the waste gas from the reverberatory copper smelting furnace is not usually lower than 2000 deg. F. (1093 deg. C.) and is frequently as high as 2300 deg. F. (1260 deg. C.). It is practically neutral, but ordinarily contains a small amount, usually less than one per cent, of free oxygen, a small amount of sulphur dioxide, and a small amount of carbon monoxide. A reducing agent, such as fine coal, may be fed with the ore into the shaft, or a hydrocarbon may be injected into the stream of highly heated waste smelter gas, preferably at the heat exchanger 12, where it will have a slight cooling effect on the waste gas before it is introduced, with the gas, into the shaft. Steam may be similarly introduced, but it is preferred to get the steam, at least in part, by charging the relatively small amount of slime wet and raw into the smelting furnace. The water introduced into the smelting furnace with the wet slime will usually furnish the necessary steam for the reactions in the roaster shaft, and the sulphur in the raw slime can be so adjusted as to provide the desired amount of sulphur for matte requirements, over that furnished by the residual sulphur in the roasted ore. It will usually be advisable to eliminate the greatest amount of sulphur from the sand with the greatest economy, and then supply the desired equivalent for matte smelting through the raw slime. This, in addition to furnishing the sulphur desired for the matte and the steam required for the reducing reactions in the roaster shaft, will reduce the dust nuisance to an irreducible minimum, especially if the raw slime is briquetted. A small amount of sulphur will combine with the hydrogen of the decomposed steam to form hydrogen sulphide, and the hydrogen sulphide can be so adjusted as to react with the sulphur dioxide, introduced with the waste smelter gas or with that formed in the roaster shaft, to produce elemental sulphur. The oxygen of the steam will combine, at the high temperature of the roaster shaft, with the iron of the pyrite, to form iron oxide. The elemental sulphur will pass, with the roaster gas, into the dust chamber. The temperature of the hot gas flowing from the roaster shaft into the dust chamber is necessarily quite high, because the reactions described are effective only at about the temperatures stated. It is desirable to recover part of this heat in the dust chamber by means of a heat interchanger (not shown), which will furnish hot air for either the roasting or smelting operations, and since every pound of fuel oil burned in either the smelting furnace or in the roaster shaft will require fifteen pounds, or 190 cubic feet of air, and since this air or its combustion products has to be brought to the roasting or smelting temperature, it is advisable to preheat the air as much as practical with otherwise waste heat. The recovery of the sulphur does not form any part of the present invention.

If the ore is introduced into the smelting furnace at the roasting temperature, ordinarily at 1200 to 1800 deg. F., a momentary contact of the hot ore with the highly heated gas will bring the ore, or at least most of it, to the smelting temperature. Since the amount of waste gas in the smelting furnace is relatively small, due to the introduction of hot ore, and preferably hot air to burn the fuel for heating, it is practical to closely approach the theoretical proportion and mixture of air and fuel, and thus to produce a localized highly heated zone of, say, 3000 deg. F. or over, through which the hot ore from the roasting furnace may be showered into the smelting furnace. The fine ore of a thin stream will be more or less scattered by the movement of the highly heated gas. The superheated zone of the smelting furnace may be constructed of special heat resistant refractories.

The invention may be applied to the concentration of iron ores, by fine grinding the ore and showering the dried ore through a highly heated reducing atmosphere in the shaft and then subjecting the reducingly roasted ore to magnetic concentration to produce a high grade iron concentrate. It may also be used to produce metallic iron, by showering finely divided iron ore, such as concentrate, through the shaft to bring it to as high a temperature as practical, and then smelt the highly heated concentrate in a reverberatory furnace for the production of metallic iron. The concentrate may be dried, and heated or roasted by the waste gas from the reverberatory smelting furnace, as described, and the highly heated concentrate, usually partly reduced, may be introduced into the smelting furnace, as described, where the reduction to metallic iron may be completed. This procedure offers some advantages over the present methods of smelting fine iron ore. The fine ore may be introduced into the smelting furnace at as nearly the smelting temperature as practical, without intermediate handling or cooling; the concentrate may be partly reduced in roasting, even to reducing part of it to sponge iron; and injurious volatile elements may be eliminated in roasting which are not easily eliminated in smelting. Sulphur may be almost completely eliminated. The atmosphere of the roaster shaft may be either oxidizing or reducing. The waste heat in smelting is used to bring the ore as near the smelting temperature as practical in the roaster shaft. It should be practical to heat the ore in the shaft to 1000 deg. C. (1832 deg. F.), or higher, without fusion or appreciable fusion, because the fusion point of pure, or relatively pure, iron oxide is higher than that of the impure ore, which always contains fluxing ingredients. The reverberatory smelting furnace unit may be made as large or larger than blast furnace smelting units. In reverberatory copper smelting, furnace units have reached a capacity of from 1000 to 1500 tons a day, smelting relatively cold ore.

In reverberatory copper smelting it is estimated that it takes 2.5 times as much heat to smelt a ton of copper ore charged into the furnace at 500 deg. F. as at 1200 deg. F. If the ore, such as flotation or other fine concentrate, is charged cold and wet, say at an average atmospheric temperature of 65 deg. F., and containing 10 per cent water, the difference will be very much greater. The 200 pounds of water contained in a ton of wet flotation concentrate, not only has to be evaporated, but the vapor and the excess air or gas has to be brought to the smelting temperature, or about 2300 to 2800 deg. F., and very little, if any, of the heat required to bring the ore and vapor to 500 deg. F. is recoverable as steam or power. This would also apply to the smelting or iron ore concentrate.

Much of the sulphur used in making sulphuric acid is obtained from pyrites. If the ore is a straight iron pyrite it is roasted for its sulphur content, and the roasted ore is then mixed with 10–12 per cent water and 5–7 per cent fine coke and sintered. If the ore contains copper, the ore is roasted, then leached to extract the copper, after which the leached residue is sintered for blast furnace iron ore smelting to recover the iron. In the present process the procedure would be quite different. The ore would be finely ground and subjected to flotation or gravity concentration to get a practically pure pyrite concentrate. If the ore contains copper the fine ground ore would be subjected to flotation to separate the copper sulphide from the iron sulphide. The fine concentrate may be oxidizingly roasted for the production of sulphur dioxide for acid manufacture, or reducingly roasted for the production of elemental sulphur, or both combined. The hot roasted ore at about 1000–1800 deg. F., containing as little sulphur as practical, would be transferred directly into a reverberatory smelting furnace and additional heat applied to liquefy it. This would result in the further elimination of impurities, either through volatilization or slagging, after which the charge could be withdrawn from the furnace and broken up as high grade iron oxide ore, containing about 70 per cent iron, which could be used in blast furnace smelting; or, better, the smelting could be so carried out so as to produce metallic iron, either by introducing reducing agents into the smelting furnace, or by blowing a reducing gas through the molten charge, as in a converter.

The size and the height of the highly heated zone of the smelting furnace may be varied to facilitate the heating of the hot showered ore introduced into it from the roasting furnace to bring it to the smelting temperature.

If special treatment of the smelter charge is desired, especially after some or most of the impurities have been eliminated by volatilization or slagging, the molten mineral or metal may be flowed into a separate furnace, as shown by 9a, Fig. 3, which, for example, may represent either a reverberatory, a converter, or an electric furnace, where it can be treated under any conditions of atmosphere, temperature, and reacting agents without interfering with the general operation of any of the preceding steps of the process.

I claim:

1. In metallurgical apparatus, a smelting furnace, a shaft roasting furnace, a dust chamber adjacent the shaft, an ore drier over the dust chamber adapted to receive its heat for drying from the hot waste gas in the dust chamber, means for delivering finely divided ore to the drier and advancing it toward the shaft roasting furnace, means for passing the hot waste gas from the smelting furnace into the shaft roasting furnace and from the shaft roasting furnace into the dust chamber, means for showering the dried ore through the shaft roasting furnace to roast it, and means for delivering the hot roasted ore separated from the roaster gas into the smelting furnace to smelt it.

2. A metallurgical apparatus comprising, a reverberatory smelting furnace adapted to receive finely divided ore charged into it at one end and to exhaust waste smelter gas at the other end, a shaft roasting furnace for roasting finely divided ore showered through it, means for passing hot waste gas from the exhaust end of the smelting furnace through the shaft roasting furnace, means for showering finely divided ore through the shaft roasting furnace to roast it, means for separately withdrawing the hot roaster gas from the roaster shaft to separate the hot roasted ore from the hot roaster gas, and means for delivering the hot roasted ore separated from the hot roaster gas from the roaster shaft into the charge end of the smelting furnace to smelt it.

3. A metallurgical apparatus comprising, a reverberatory smelting furnace adapted to receive finely divided ore charged into it at one end and to exhaust waste smelter gas at the other end, a shaft roasting furnace, a dust chamber communicating through a gas passage with the gas exhaust end of the shaft roasting furnace, an ore drier over the dust chamber, means for flowing hot waste gas from the smelting furnace into the shaft roasting furnace, means for delivering finely divided ore to the drier to dry it, means for showering the dried ore through the shaft roasting furnace to roast it, means for flowing the hot waste roaster gas into the dust chamber to settle the dust and impart heat to the drier, and means for delivering the hot roasted ore separated from the roaster gas from the roaster shaft into the charge end of the smelting furnace to smelt it.

4. A metallurgical apparatus comprising, a reverberatory smelting furnace adapted to receive finely divided ore at one end and to exhaust waste smelter gas at the other end, a shaft roasting furnace over the charge end of the smelting furnace, a horizontally elongated dust chamber over the smelting furnace, a horizontally elongated ore drier over the dust chamber, means for flowing hot waste gas from the smelting furnace into the shaft roasting furnace, means for delivering finely divided ore to one end of the drier and moving it while drying toward the shaft roasting furnace, means for showering the dried ore through the shaft roasting furnace to roast it, means for flowing the hot waste roaster gas into the dust chamber to settle the dust and impart heat to the drier, and means for delivering the hot roasted ore separated from the roaster gas from the roaster shaft into the charge end of the smelting furnace to smelt it.

5. A metallurgical apparatus comprising, a reverberatory smelting furnace enlarged vertically at its charge end and adapted to receive hot finely divided ore at the enlarged end and to exhaust waste smelter gas at the other end, a shaft roasting furnace, means for showering finely divided ore through the shaft to roast it, a fuel burner at the enlarged charge end of the smelting furnace adapted to create a highly heated atmosphere therein, means for withdrawing the hot roaster gas from the roaster shaft to separate the hot roasted ore from the hot roaster gas, and means for showering the hot roasted ore separated from the hot roaster gas in a substantially continuous stream through the highly heated atmosphere of the vertically enlarged charge end of the smelting furnace to bring it to the fusion temperature to smelt it.

6. A metallurgical apparatus comprising, a reverberatory smelting furnace adapted to receive hot finely divided ore at one end and to exhaust waste smelter gas at the other end, a shaft roasting furnace positioned over the charge end of the smelting furnace, means for passing hot waste smelter gas through the roaster shaft, means for showering finely divided ore through the hot smelter gas in the roaster shaft to roast it, a fuel burner at the charge end of the smelting furnace adapted to create a highly heated atmosphere therein, means for withdrawing the hot roaster gas from the roaster shaft to separate the hot roasted ore from the hot roaster gas, and means for introducing the hot roasted ore separated from the hot roaster gas from the roaster shaft in a substantially continuous stream into the charge end of the smelting furnace through its roof and showering it through the highly heated atmosphere to bring it to the smelting temperature to smelt it.

7. A metallurgical apparatus comprising, a reverberatory smelting furnace adapted to receive hot finely divided ore at one end and to exhaust hot waste smelter gas at the other end, a shaft roasting furnace over the charge end of the smelting furnace, a hot roasted ore passage between the bottom of the roasting furnace and the top of the smelting furnace, a horizontally elongated dust chamber communicating through a gas passage with the exhaust end of the roasting furnace, a horizontally elongated ore drier over the dust chamber extending over the roaster shaft, means for delivering finely divided ore to one end of the drier and by means of the drier advancing it to the other end over the roaster shaft, means for showering the dried ore through the roaster shaft to roast it, means for flowing the hot waste roaster gas from the roaster shaft into the dust chamber to settle the dust and impart heat to the drier, and means within the hot ore roaster discharge passage to deliver the hot roasted ore in a substantially continuous thin stream into the feed end of the smelting furnace and showering it through the highly heated atmosphere of the charge end of the smelting furnace.

8. A metallurgical apparatus comprising, a shaft roasting furnace adapted to roast finely divided ore showered through it, a horizontally elongated dust chamber adjacent the roaster shaft, a horizontally elongated ore drier over the dust chamber extending over the roaster shaft, means for delivering finely divided ore to one end of the drier and by means of the drier delivering the dried ore over the roaster shaft, means for flowing the dried ore in a substantially continuous stream into the roaster shaft through its roof, means for distributing the ore of the stream and showering it through the roaster shaft, and means for withdrawing the exhaust roaster gas from the shaft into the dust chamber to settle the dust and impart heat to the drier.

9. A metallurgical apparatus comprising, a reverberatory smelting furnace enlarged vertically at its charge end and adapted to receive finely divided ore at the enlarged charge end and to exhaust waste smelter gas at the other end, a shaft roasting furnace over the enlarged charge end of the smelting furnace, a horizontally elongated dust chamber extending longitudinally over the smelting furnace, a gas passage between the shaft roasting furnace and the dust chamber, a horizontally elongated ore drier over the dust chamber extending over the roaster shaft, means for delivering finely divided ore to one end of the dryer and by means of the dryer advancing it to the other end over the roaster shaft, means for showering the dried ore through the roaster shaft to roast it, means for flowing the hot waste roaster gas from the roaster shaft into the dust chamber to settle the dust and impart heat to the drier, and means for showering the hot roasted ore separated from the roaster gas into the vertically enlarged end of the smelting furnace to smelt it.

WILLIAM E. GREENAWALT.